June 1, 1965  M. W. ADKINS  3,186,820
GLASS SPIRAL WINDING MACHINE
Filed Sept. 12, 1960
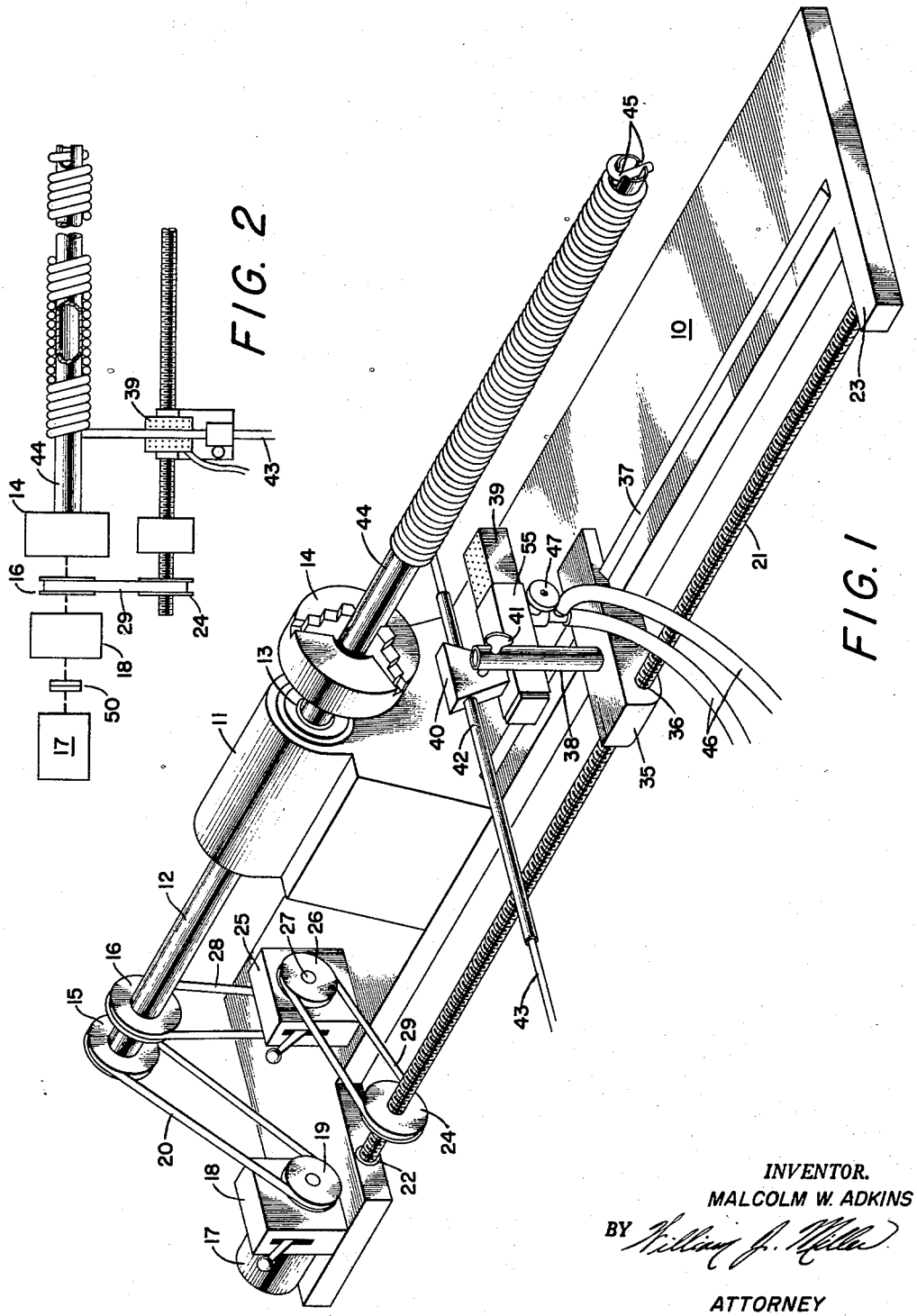
INVENTOR.
MALCOLM W. ADKINS
BY
ATTORNEY

United States Patent Office

3,186,820
Patented June 1, 1965

3,186,820
GLASS SPIRAL WINDING MACHINE
Malcolm W. Adkins, Ponca City, Okla., assignor to Continental Oil Company, Ponca City, Okla., a corporation of Delaware
Filed Sept. 12, 1960, Ser. No. 55,571
2 Claims. (Cl. 65—271)

This invention relates generally to a glass spiral winding machine and in particular, but not by way of limitation, to a glass spiral winding machine which is adapted to form glass spirals from preformed lead based-glass or Pyrex tubing.

The formation of glass spirals from preformed glass tubing has become extremely important in the field of gas chromatography. In order to have a heated glass tube many feet in length, convenience necessitates that the glass tube be wound in a spiral. As much as twenty to thirty feet of glass tubing may be wound in order to provide adequate separation of the elements according to their molecular weight in the gas chromatography apparatus. Such glass spirals have always been formed by hand using a solid mandrel covered with asbestos, the glass spiral being formed over the asbestos. Such a glass spiral was tedious to form, nonuniform in circular diameter and extremely expensive to fabricate.

Machines have been designed to manufacture glass spirals primarily for fluorescent lights; however, these machines are all designed for use with a molten glass reservoir. In addition, the glass used is the lead based-glass which characteristically has a long cooling time after heating. In the gas chromatography field, the spirals must be formed of Pyrex glass which characteristically has a very short cooling time thereby increasing the problems of forming a uniform glass spiral. Another problem besetting the laboratory technicians results in the characteristic of the Pyrex glass, namely, that the glass can never be heated to a molten state since it would then devitrify, that is, some of the chemicals would burn out of the glass destroying its particular characteristics and causing it to lose its transparency.

Therefore, it is an object of this invention to provide a machine that will form a glass spiral from preformed lead based or Pyrex glass tubing rapidly and economically.

It is another object of this invention to provide a machine that will form a glass spiral from Pyrex glass.

It is another object of this invention to provide a machine that will form a glass spiral rapidly and accurately.

It is a still further object of this invention to disclose a novel mandrel for forming a glass spiral.

This invention features a glass spiral winding machine having a lathe type bed with a chuck mounted on one end thereof, a motor for driving said chuck and a variable speed controlling device connected between the motor and the chuck for accurately controlling the speed thereof, a feed means parallelly mounted with the axis of the chuck and adapted to move a tubing mount and burner parallel with the axis of said chuck, a second speed control means is connected between the motor and the feed means to accurately control the movement of said burner and glass tubing mount such that when a hollow mandrel is placed within the chuck a glass spiral may be formed about said mandrel by co-ordinated movement between the chuck and the feed means.

Another feature of this invention is a hollow mandrel formed of stainless steel. The hollow mandrel is adapted to be heated along with the glass tubing used to form a glass spiral thereon in the proximity of where the spiral is being formed such that when the spiral is completely formed said spiral and mandrel will cool. The cooling of the mandrel will cause it to shrink in diameter more than the shrinkage in the diameter of the glass spiral thereby readily permitting the glass spiral to be removed therefrom.

Other objects, features, and advantages of the invention will become apparent from the following description and claims when read in view of the accompanying drawings, in which:

FIG. 1 is a third dimensional view of the complete glass spiral winding machine; and FIG. 2 is a top view of the glass spiral winding machine showing a partial section of the mandrel.

Referring to the figures and in particular to FIG. 1, a glass spiral winding machine is shown comprising a bed 10 which may be made of any suitable material such as steel. Attached to bed 10 is a chuck support 11 which is adapted to rotatably mount a shaft 12 by means of any suitable method such as a sleeve bearing 13. On one end of shaft 12 is mounted a chuck 14 of any suitable variety such as a three-jaw or four-jaw chuck. A plurality of pulleys 15 and 16 are mounted on the other end of shaft 12. A motor 17 is attached to bed 10 and is directly connected to a variable speed drive 18. The output from variable speed drive 18 is supplied to a pulley 19. Pulley 19 and pulley 15 are connected by any suitable manner such as a belt 20. A lateral traversing mechanism is mounted on one side of lathe bed 10 and comprises a feed screw 21 rotatably mounted in the bearings 22 and 23 (not shown). A pulley 24 is rigidly mounted to the end of feed screw 21 that is nearest the motor.

A second variable speed drive 25 is attached to base plate or bed 10 and has a pulley-driven input (not shown) and a pulley 26 connected to its output shaft 27. The input to variable speed drive 25 is supplied from pulley 16 through a means such as a belt 28. Feed screw 21 is coupled to the motor through output pulley 26, a belt 29 and pulley 24. A tool support 35 is mounted transverse to the axis of shaft 12. Feed screw 21 passes through a threaded portion 36 of tool support 35. Means may be provided for engaging or disengaging the threaded portion 36 from the feed screw 21. Tool support 35 may have additional guidance by means of a V-way 37 if such is found necessary. A perpendicular upright 38 is mounted to tool support 35 and supports a ribbon burner 39 and a glass tubing guide holder 40. Any suitable means such as a wing nut 41 may be used to attach glass tubing guide holder to vertical upright 38 and further to permit slight adjustment of the portion of guide holder 40. An adjustable plate 55 surrounds a burner 39 and regulates the number of exposed burner holes and thus the heat supplied by the burner. A guide 42 is rigidly mounted through guide holder 40 and forms a support for a glass tubing 43. A mandrel 44 is inserted in chuck 14 and functions as the form for wrapping the glass spiral. A pair of slots 45 provide an anchor for the glass tubing during the initial winding stages. Gas and air are supplied to gas and air burner 39 through a pipe 46 and a valve 47.

The operation of the glass spiral winding machine is as follows:

Mandrel 44 is placed within chuck 14 and glass tubing 43 inserted through guide 42 and into slots 45. Burner 39 is ignited and the glass tubing and mandrel heated sufficiently to cause glass tubing 43 to soften. Motor 17 is then started causing pulley 19 and pulley 15 to rotate turning mandrel 44 in a counterclockwise direction. Rotation of shaft 12 will cause pulley 16 to rotate thereby rotating pulleys 26 and 24. Feed screw 21 will then rotate causing tool support 35 to move toward chuck 14; however no winding will take place until glass tubing 43 softens sufficiently to permit mandrel 44 to turn. The speed adjustment through variable speed drives 18 and 25 may be carefully adjusted to synchronize the rotation of mandrel 44 with the lateral movement of tool support 35. The adjustments can be easily made and the glass spiral wound with no breakage or undue stretching of the softened glass.

Heat is applied to both the glass and the mandrel 44 simultaneously, the heat causing the mandrel to expand a few thousandths of an inch in diameter. The glass is then wrapped upon expanded mandrel. As the tool support 35 wraps the glass spiral further down the mandrel, the mandrel will cool, thereby releasing the glass spiral from tight contactual relation with the mandrel circumference. By proper calculation of the expanded mandrel diameter, extremely precise glass spirals can be wound. The mandrel will be more completely described in a like portion of the specification.

A unique modification of this machine is disclosed in FIG. 2 where similar numbers are used for corresponding parts in FIG. 1.

Rather than controlling the speed of feed screw 21 and mandrel 44 by a direct drive through pulleys 19, 15, and belt 29, a slip clutch 50 is incorporated. This will provide a much improved glass spiral since the winding of the glass spiral is then solely dependent upon the rate of softening of glass tube 43. Thus, slip clutch 50 is adjusted so that mandrel 44 and feed screw 21 will turn until glass tubing 43 has softened sufficiently to reduce the winding torque on shaft 12. As burner 39 softens tubing 43, shaft 12 will turn, wrapping the softened glass about mandrel 44 and exposing a new portion of hardened glass. As this portion heats up sufficiently to soften, it is wrapped about mandrel 44, etc. It is, of course, understood that under normal winding conditions, the process is substantially continuous. The winding of the spiral, however, being fully controlled by the heat of burner 39 and the plastic condition of glass tubing 43. Perfect glass spirals can be formed by using this technique.

One of the extremely unique features of my invention is the thin walled hollow mandrel 44 which may be made of any suitable material, for example, stainless steel. The metal, however, should have the ability of withstanding the temperature of the burner 39 without corrosion so that deposits will not be left on the softened glass spiral. The expansion of the mandrel should also be sufficient so that the glass tubing may be readily removed when the mandrel cools. In normal operation, the mandrel is placed in chuck 14 and over burner 39. A glass tubing is placed through guide 42 and into slots 45. When the burner 39 is ignited heat will cause mandrel 44 to expand and glass tubing 43 to soften. As mandrel 44 turns, slots 45 will rigidly clamp the glass tubing preventing slippage of the spiral. Tool holder 45 moves the width of the glass tubing for one revolution of mandrel 44 by proper adjustment of the speed drive 18, thereby providing a neat spiral. Since the expansion of the glass tubing for a given temperature of burner 39 is constant and predictable, a glass spiral having a precise internal diameter can be formed.

While the embodiment in FIG. 2 discloses a slip clutch 50, it is obvious that slippage may be performed in other ways and yet be within the intent and scope of this invention; for example, belts 20, 28, or 29 may be loosely clamped between their respective pulleys. Therefore, an excessive torque on shaft 12 will cause slippage of the belts, thereby accomplishing the same purpose as slip clutch 50. Further, the speed drive reduction mechanisms 18 and 25 may incorporate a slippage type mechanism thereby accomplishing the same purpose as slip clutch 50.

Although this invention has been described with respect to particular embodiments thereof, it is not to be so limited, as changes and modifications may be made therein which are within the spirit and scope of the invention as defined by the appended claims.

What I claim is:

1. A glass spiral winding machine adapted to wind glass spirals from glass tubing stock, comprising:
   a bed;
   a chuck rotatably supported on the bed;
   a glass forming mandrel secured in the chuck for rotation with the chuck;
   feed means rotatably mounted on the bed parallel to the axis of the chuck;
   glass tubing support means on the feed means for holding the glass tubing stock and moving along the feed means upon rotation of the feed means to wind the tubing on the glass forming mandrel;
   a burner carried by the glass tubing support means for heating the mandrel and the tubing being wound on the mandrel;
   a drive motor on the bed; and
   a slipping drive system connecting the drive motor to the chuck and to said feed means to disconnect the drive motor from the chuck and feed means when the bending resistance of the tubing exceeds a predetermined level to prevent breakage of the tubing.

2. The machine defined in claim 1 wherein said mandrel comprises an elongated hollow, solid-wall stainless steel tube having a wall thickness substantially less than its diameter, said tube being sized for insertion in the winding machine chuck for rotation with the chuck, and said mandrel having a means at one end thereof for securing a glass tubing to be wound thereabout.

References Cited by the Examiner

UNITED STATES PATENTS

| 379,393 | 3/88 | Harvey | 153—67 |
| 2,373,427 | 4/45 | Stickney | 153—64 |
| 2,504,426 | 4/50 | Keyzer | 65—108 |
| 2,573,300 | 10/51 | Beaumariage et al. | 65—292 |

FOREIGN PATENTS

| 142,622 | 3/19 | Great Britain. |
| 396,018 | 1933 | Great Britain. |

OTHER REFERENCES

"Procedures in Experimental Physics," John Strong et al., Prentice-Hall, Inc., p. 11 cited.

DONALL H. SYLVESTER, *Primary Examiner.*

IVAN R. LADY, MORRIS O. WOLK, *Examiners.*